(12) United States Patent
Santosh et al.

(10) Patent No.: US 10,628,781 B2
(45) Date of Patent: *Apr. 21, 2020

(54) ADDRESS EXCHANGE SYSTEMS AND METHODS

(71) Applicant: MapMyId, Inc., Alpharetta, GA (US)

(72) Inventors: Kush Santosh, Alpharetta, GA (US); Akshat Keshan, Cupertino, CA (US); John Lee, San Ramon, CA (US); Arunachalam Muthu, Fremont, CA (US); Fakhruddin Hatim Chopdawala, Pune (IN)

(73) Assignee: MapMyId, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,080

(22) Filed: Sep. 4, 2019

(65) Prior Publication Data
US 2019/0392372 A1    Dec. 26, 2019

Related U.S. Application Data

(63) Continuation of application No. 15/652,370, filed on Jul. 18, 2017, which is a continuation of application
(Continued)

(51) Int. Cl.
*G06F 21/00* (2013.01)
*G06Q 10/08* (2012.01)
(Continued)

(52) U.S. Cl.
CPC ......... *G06Q 10/083* (2013.01); *G06F 9/4484* (2018.02); *G06Q 20/085* (2013.01);
(Continued)

(58) Field of Classification Search
CPC ...... G06F 21/6245; G06F 9/4484; G06F 9/54; G06F 21/36; G06Q 10/08; G06Q 10/083;
(Continued)

(56) References Cited

U.S. PATENT DOCUMENTS

| 7,729,359 B1 * | 6/2010 | Kumar | H04L 51/28 370/389 |
| 2007/0088749 A1 * | 4/2007 | Lorch | G07B 17/00435 |

(Continued)

OTHER PUBLICATIONS

International Search Report and Written Opinion of the International Searching Authority prepared by the USPTO in connection with PCT/US2019/20628, dated May 23, 2019; Entire Document (20 pages).

*Primary Examiner* — Yogesh Paliwal
(74) *Attorney, Agent, or Firm* — Richards Patent Law P.C.

(57) ABSTRACT

The present disclosure provides systems and methods for an address exchange system including a controller configured to provide an API configured to receive an identifier from a user and further configured not to receive a physical address from the user, wherein the user provides an item for shipment to the physical address. In response to receiving the identifier, the controller is further adapted to calculate a maximum cost of the item, including one or more of a maximum sales tax and maximum shipping cost. The systems and method receive payment for the maximum cost and then refund the difference between the maximum cost and actual cost after the item has shipped.

18 Claims, 5 Drawing Sheets

Related U.S. Application Data

No. 14/681,356, filed on Apr. 8, 2015, now Pat. No. 9,710,778, which is a continuation of application No. 14/016,099, filed on Aug. 31, 2013, now Pat. No. 9,009,859.

(51) Int. Cl.
  *G06Q 20/08* (2012.01)
  *G06F 9/448* (2018.01)
  *G06Q 20/12* (2012.01)
  G06F 21/62 (2013.01)
  G06F 21/36 (2013.01)

(52) U.S. Cl.
  CPC ............ *G06Q 20/12* (2013.01); *G06F 21/36* (2013.01); *G06F 21/6245* (2013.01)

(58) Field of Classification Search
  CPC ... G06Q 20/085; G06Q 30/0641; G06Q 20/12
  See application file for complete search history.

(56) References Cited

U.S. PATENT DOCUMENTS

| | | | |
|---|---|---|---|
| 2011/0145107 A1* | 6/2011 | Greco | ................... G06Q 10/08 |
| | | | 705/27.2 |
| 2014/0019352 A1 | 1/2014 | Shrivastava | |
| 2014/0075580 A1* | 3/2014 | Santosh | ............. G06F 21/6245 |
| | | | 726/30 |
| 2014/0337246 A1 | 11/2014 | Williams et al. | |
| 2016/0125412 A1 | 5/2016 | Cannon | |
| 2016/0292636 A1 | 10/2016 | Moody et al. | |
| 2017/0186037 A1 | 6/2017 | Brady | |

* cited by examiner

FIG. 5

Checkout

Billing Address → Receiver's Email → Shipping Method → Payment Method → Confirmation Shipping Information Receiver's Email Address

| johndoe@gmail.com | ~20

Receiver's Name

| John Doe | ~30

Gift Message

| Happy Birthday!
| Love, Jane

| Cart | | |
|---|---|---|
| 1 | Shower Curtain | 20.00 |
| 1 | Hooks (12 set) | 10.00 |
| Total | | 30.00 |

Go Back    Submit

ADDRESS EXCHANGE SYSTEMS AND METHODS

CROSS-REFERENCE TO RELATED APPLICATIONS

This application is a continuation application of and claims the benefit of priority to U.S. patent application Ser. No. 15/652,370 filed Jul. 18, 2017, which claims the benefit of priority to U.S. patent application Ser. No. 14/681,356 filed Apr. 8, 2015, which claims the benefit of priority to U.S. patent application Ser. No. 14/016,099 filed Aug. 31, 2013, which claims the benefit of priority to U.S. Provisional Application 61/697,824 filed on Sep. 7, 2012, which is also incorporated by reference in its entirety.

BACKGROUND OF THE INVENTION

The present subject matter relates generally to systems and methods for an online identification to a physical address exchange platform.

In today's society, people are identified by a plethora of identifiers including their name, social security number, bank account number, residential address, password, birth date, and email address, among others. Because many identifiers are confidential information, most people prefer to keep their information private. However, individuals are continually asked to share their identifiers with third parties, for example, by providing a mailing address to a third party or by providing a billing address when purchasing an item online. However, it may be unsafe to share identifiers, such as a physical address, with unknown individuals. Moreover, the more confidential information an individual discloses, the more likely the person will be subjected to privacy challenges.

During a typical transaction, a sender selects an item from a retailer's website to send to a receiver. During checkout, the sender must input his or her name, the billing address of the buyer, gift options, the name of the receiver, the address of the receiver, and the phone number of the receiver. Based on the large amount of required information, many senders decide not to complete the purchase owing to either not having the time to complete the checkout process or because the sender may not have all of the receiver's personal information. For example, the sender may not have the physical address of the recipient and, perhaps, does not feel comfortable asking for such personal information from the receiver. In addition, physical addresses change often such that it is difficult for senders to track the changes in address in order to determine the most current address to use as the mailing address.

From a recipient's perspective, providing his or her residential address is not safe. In addition, updating a change of address is often a time consuming and laborious process. Typically, a recipient must update their address information in each organization. For example, a recipient must update their address with the post office, department of motor vehicle, internal revenue service, energy company, magazine subscriptions, place of employment, among a multitude of others.

In addition, conventional systems do not take into account the recipient's preference in shipping location. For example, a recipient may want certain packages sent from friends to be mailed to his or her home address, where as the recipient may want to gifts from colleagues to be mailed to his or her work address.

Accordingly, there is a need for systems and methods directed to an address system that does not jeopardize an individual's privacy information while taking into account a recipient's preferences.

BRIEF SUMMARY OF THE INVENTION

The present disclosure provides systems and methods for an address exchange platform. Various examples of the systems and methods are provided herein.

The present address exchange system is a technology platform that manages and provides confidential information, such as a residential address, to third party merchants, retailers, and shipping companies. The present system provides various integration points with third party companies, such as retailers, merchants, shipping companies, government agencies, financial institutions, or any other organization that collects and uses an address of its members. In one example, the address exchange system receives an email address of an intended recipient from a sender and provides a physical address of a receiver based on the submitted email address of the receiver. In other words, the system allows senders to send packages and gifts to receivers based only on the sender providing a receiver's identification, such as the receiver's email address or phone number, thereby maintaining the confidential nature of a physical address.

In an embodiment, the address exchange system comprises a memory coupled to the controller, wherein the memory is configured to store program instructions executable by the controller. In response to executing the program instructions, the controller is configured to provide an API configured to receive an identifier from a user and further configured not to receive a physical address from the user, wherein the user provides an item for shipment to the physical address.

In response to receiving the identifier, the controller is further adapted to request the physical address from a data storage system wherein the data storage system stores an association between the identifier and the physical address, and retrieve the physical address and calculate an actual shipping cost based on the physical address.

In an example, the system further stores one or more permission settings defining situations in which the physical address is to be provided in response to receipt of the identifier. In an example, in response to receipt of the identifier, the data storage system tests the permission settings to determine whether or not to provide the associated physical address.

The determination as to whether or not to provide the associated physical address may further include verifying a password associated with the physical address, wherein the data storage system further stores a password linked to the associated identifier and physical address.

The permission settings may include one or more domains to which the physical address may be provided when the identifier is received from the one or more domains. Alternatively, or in addition to, the permission settings may include a setting requiring the data storage system to request and receive approval to provide the associated physical address via a direct communication made according to a predefined communication protocol.

The predefined communication protocol may be an email message, an SMS message, a phone call, a mobile application communication, or combinations thereof.

In an example, the user interface may be provided within an ecommerce platform and/or an online shipping platform.

In another embodiment, the address exchange system comprises a memory coupled to the controller, wherein the memory is configured to store program instructions executable by the controller. In response to executing the program instructions, the controller is configured to provide a data storage system storing an association between an identifier and a physical address and further storing one or more permission settings defining situations in which the physical address is to be provided in response to receipt of the identifier. The controller is further configured to receive a request to provide the physical address, wherein the request includes the identifier. In response to receiving a request to provide the physical address, the data storage system tests the permission settings to determine whether or not to provide the associated physical address.

The request to provide the physical address may be received from an API, wherein the API is configured to receive an identifier from the user and further configured not to receive the physical address from the user. The request to provide the physical address may further include a password.

The determination as to whether or not to provide the associated physical address may further include verifying the password, wherein the data storage system further stores a password linked to the associated identifier and physical address.

The permission settings may include one or more domains to which the physical address may be provided when the request to provide the physical address is received from the one or more domains. The permission settings may include a setting requiring the data storage system to request and receive approval to provide the associated physical address via a direct communication made according to a predefined communication protocol.

The predefined communication protocol may be an email message, an SMS message, a phone call, a mobile application communication, or combinations thereof.

An advantage of the present systems and methods is providing a solution to the challenge of sending gifts or packages without knowing the recipient's address. Similarly, the system does not require a recipient to disclose his or her residential address to third parties or strangers.

A further advantage of the present systems and methods is providing a safe and secure way of mapping online and offline identifications, wherein the identifications may be used in various applications.

Yet another advantage of the present systems and methods is allowing merchants to focus on their core business, instead of spending time and money directed to determining a correct address for shipments and tracking lost packages.

Another advantage of the present systems and methods is providing a single platform to map online and offline identifications, thereby avoiding multiple registrations with each merchant of users' physical mailing address.

A further advantage of the present systems and methods is providing more efficient commerce and shipping solutions, including ecommerce solutions.

Another advantage of the present system is enabling retailers to complete more transactions and focus on their primary business instead of spending time and resources devoted to obtaining and tracking physical addresses.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 5 is an example of a screen shot of a check out interface including an option to enter the receiver's email address.

DETAILED DESCRIPTION OF THE INVENTION

Figure 1:
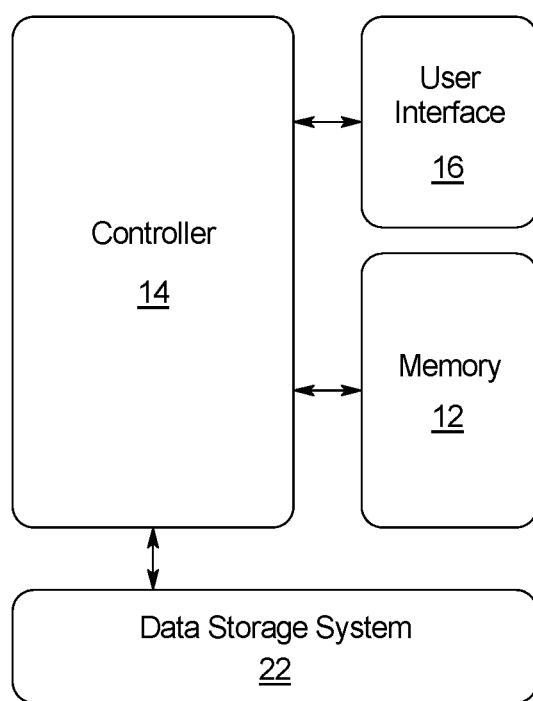
FIG. 1 is a schematic of an embodiment of the address exchange system.

The present disclosure provides an address exchange system 10 comprising a memory 12 coupled to the controller 14, wherein the memory is configured to store program instructions executable by the controller 14, as shown in FIG. 1. In response to executing the program instructions, the controller 14 is configured to provide an API 16 configured to receive an identifier 19 from a user 15 and further configured not to receive a physical address 18 from the user, wherein the user 15 provides an item for shipment to the physical address 18. The user 15 may be any person or entity. In the majority of examples in the present application, the user 15 is a retailer, merchant, or shipping entity. For example, in FIGS. 2-4, the user 15 is a retailer or shipping entity. However, the user 15 is not limited to retailers and shipping entities, but includes any organization, entity, or person that uses a unique identifier to provide a physical mailing address.

Figure 2:
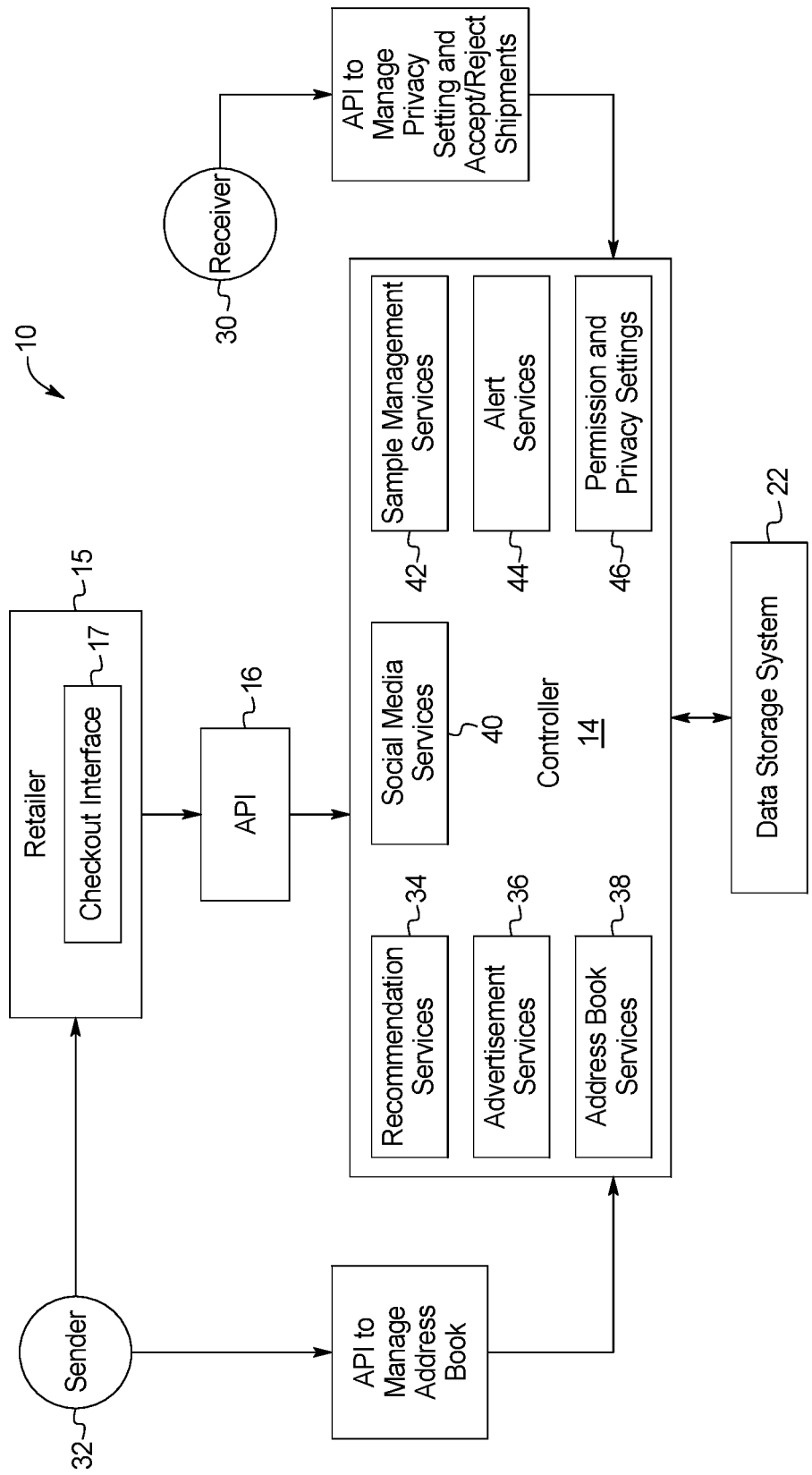
FIG. 2 is a schematic of an embodiment of the address exchange system in relation to a sender and receiver.

FIG. 2 illustrates the interplay between the address exchange system 10 and a sender 32, a user 15, and a receiver 30. For example, the sender 32 may be a person that selects a gift from goods sold by a user 15 (e.g., retailer), and desires the user 15 to ship the gift to the intended receiver 30. In another example, the sender 32 may be the same person or entity as the receiver 30, such as when a person buys and ships an item to himself or herself. The user 15 (e.g., retailer) interacts with the controller 14 via the API 16. The API 16 is configured to receive an identifier 19 from the user 15, and further configured not to receive the physical address 18 from the user 15. In other words, system 10 allows a sender 32 to send a shipment based on the identifier 19 of the receiver 30.

Although throughout this disclosure the receiver 30 is identified by the identifier 19 of an email address 20, it should be understood that any suitable identifier 19 may be used. For example, identifier 19 may be a telephone number associated with the intended receiver 30, wherein the telephone number is associated with the physical address 18. Similarly, the identifier 19 may be a social network identification of the receiver 30, wherein the social network identification is associated with the physical address 18 of the receiver 30. In other words, the controller 14 may be configured to receive any identifier 19 of the receiver 30 that is associated with the receiver's 30 physical address 18, including, but not limited to, an email address 20, social network identification, phone number, or any other unique identifier, or combinations thereof.

In one example, a sender 32 selects an item for shipment to a physical address 18 through a checkout interface 17 that is in communication with the user 15. The checkout interface 17 and/or the API 16 may be provided within an ecommerce platform or product, as well as an online shipping platform. For example, the sender 32 may provide the identifier 19 associated with the intended receiver 30 of the item to the checkout interface 17. The user 15 may then provide the email address 20 to the controller 14 via the API 16.

In addition to providing the identifier 19 of the receiver 30 to the controller 14, the user 15 may also provide information associated with the sender 32. For example, the user 15 may provide identification of the sender and transaction details associated with the item being purchased and/or shipped. The identification of the sender 32 may include a name, email address, telephone number, address, social network identification, or any other suitable identification of the sender 32. The transaction details may include the retailer or store the item is purchased or shipped, the content of the item being shipped, the time frame of the shipping dates, among other information. In other words, the controller 14 may be configured to provide an API 16 configured to receive an identifier 19 associated with the receiver 30, an identification associated with the sender 32, and transaction details associated with the item, and further configured not to receive a physical address 18 from the user, wherein the sender 32 provides an item for shipment to the physical address 18.

In response to receiving the identifier 19, the controller 14 is further adapted to request the physical address 18 from a data storage system 22 wherein the data storage system 22 stores an association between the identifier 19 and the physical address 18. The data storage system 22 may be any suitable storage system, for example, a database.

The data storage system 22 may further store one or more permission settings 24 defining situations in which the physical address 18 is to be provided in response to receipt of the identifier 19. The permission settings 24 may include one or more domains to which the physical address 18 may be provided when the identifier 19 is received from the one or more domains. For example, the permission settings 24 may be set such that, if the identifier 19 is received from a certain user 15, such as a specific person or website associated with a certain retailer, then the controller 14 is authorized to provide the physical address 18 to that specific person or retailer. The permission settings 24 may include providing the identification of the sender 32 and transaction details associated with the item being received.

Alternatively, or in addition to, the permission settings 24 may include a setting requiring the data storage system 22 to request and receive approval to provide the associated physical address 18 via a direct communication made according to a predefined communication protocol 28. For example, the approval may be dependent on the identification of the sender 32 as well as the transaction details. In other words, the permission settings 24 may include granting permission if the request is from a certain sender 32. However, the permission settings 24 may include denying permission to receive the item if the transaction details indicate the item is flowers, for example, if the receiver 30 has allergies.

The predefined communication protocol 28 may be an email message, an SMS message, a phone call, a mobile application communication, such as a mobile app to app communication, or combinations thereof. For example, the permission settings 24 may be set such that the controller 14 is configured to send an email to a person or entity (e.g., receiver 30) associated with the physical address 18 requesting permission to provide the physical address 18 to the user 15, for example, a merchant or shipping company. Further, the permission settings 24 may be customized by the receiver 30 via an API to manage the privacy and settings for the receiver 30 and sender 32, wherein the API 16 is in communication with the controller 14, as shown in FIG. 2.

In response to receipt of the identifier 19, the data storage system 22 tests the permission settings 24 to determine whether or not to provide the associated physical address 18. For example, if the permission settings 24 include sending an SMS message, then the controller 14 sends an SMS message requesting authority to provide the physical address 18 to the user 15. If authority is granted, then the controller 14 provides the physical address 18 to the user 15. As understood by one skilled in the art, the identifier 19 and/or the physical address 18 may be encrypted when sent and decrypted when received.

The permission settings 24 may be set such that the controller 14 is configured to receive and verify a password 26 in order to provide the physical address 18 to the user 15. Further, the determination as to whether or not to provide the associated physical address 18 may further include verifying the password 26, wherein the data storage system 22 further stores the password 26 linked to the associated email address 20 and physical address 18. In other words, in addition to requesting authority from a person or entity associated with the physical address 18, the controller 14 may be configured to request and confirm a password 26 associated with the physical address, before authority is received or denied.

Although throughout the description, the example of the controller 14 receiving an identifier 19 from the user 15 and providing an associated physical address 18 to the user 15 is used, it should be understood that other methods of providing the physical address 18 are contemplated within this disclosure. For example, upon receiving an identifier 19 and obtaining the associated physical address 18 from the data storage system 22, the physical address 18 may be provided to the user 15 in text form or as a code, such as bar code or QR code, or any other encrypted manner. When user 15 is a retailer, for example, the physical address 18 is provided to the user 15 in the form of a shipping label including a bar code or QR code, the physical address 18 remains confidential and may not be disclosed to the user 15.

Figure 3:
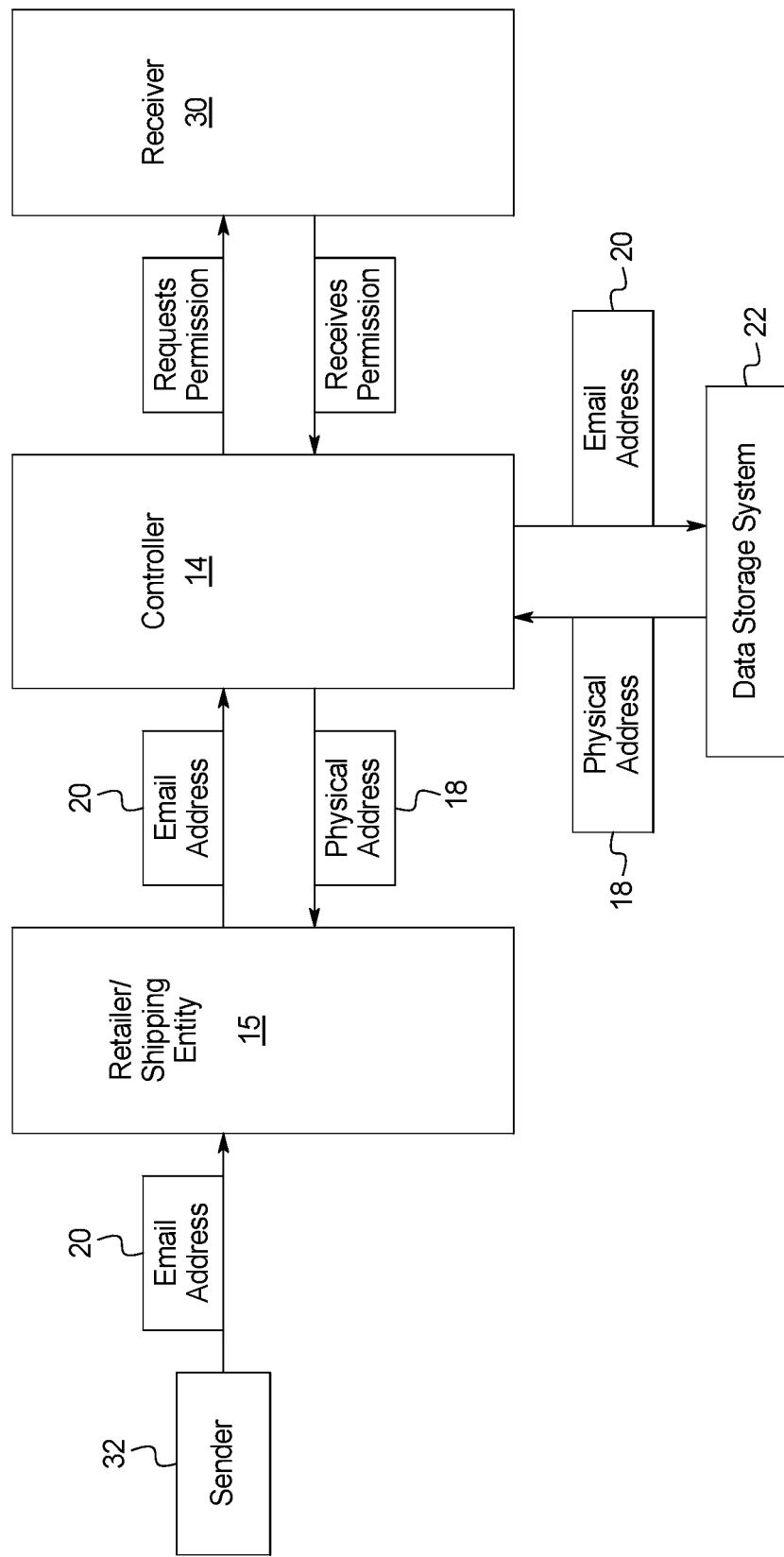
FIG. 3 is a flow diagram including an embodiment of the address exchange system.

As shown in FIG. 3, a sender 32 provides an email address 20 of the intended receiver 30 to the user 15 (e.g., retailer/shipping entity). Of course, any form of communication identification of the intended recipient is contemplated, including, but not limited to, social media identification, phone number, email address, among others. The user 15 then sends the email address 20 to the controller 14, via the API 16. The controller 14 sends an email (or other communication protocol 28; not shown) to the receiver 30 requesting permission to send the physical address 18 to the user 15. If the receiver 30 grants the request, the controller 14 accesses the data storage system 22 and obtains the physical address 18 that corresponds to the email address 20, and provides the physical address 18 to the user 15 (e.g., retailer/shipping entity). Importantly, the physical address 18 is not provided to the sender 32. Instead, the physical address 18 remains confidential and only sent to the user 15, such as a retailer or shipping entity, for shipping purposes.

In one example, a sender 32 provides to the user 15 three pieces of information: an identifier of the intended receiver (e.g., email address, social media contact, phone number, etc.), an identification of the sender 32, and transaction details surrounding the item selected by the sender 32. The user 15 then provides the identification of the sender 32 and the transaction details to the receiver 30 for permission to provide the user 15 with the physical address 18 associated with the receiver 30. In yet another example, the sender 32 may provide an identifier of the intended receiver along with a geographical area associated with the recipient, such as a region of the country, state, town, municipality, or neighborhood, among others. Such geographical area can be used to calculate the estimated shipping and/or tax costs that can be communicated to the user for payment.

In addition, the user 15 is separate and distinct from the address exchange system 10. In other words, one of the main purposes of the address exchange system 10 is to confidentially supply physical addresses to users 15, such as merchants and shipping companies. The address exchange system 10 is not included within a retailer or shipping company. In other words, the address exchange system 10 is an independent entity from the user 15.

In one example, if a sender 32 selects an item for shipment to a physical address 18, wherein the identifier 19 is not contained in the data storage system 12, the controller 14 may be configured to send an email or other communication to the person or entity associated with the identifier 19 requesting, not only permission to provide the physical address 18, but the content of the physical address 18. Further, the controller 14 may be configured to send an email to the person or entity associated with the identifier 19 requesting authority to store an email address 20 and associated physical address 18 in the data storage system 22.

Figure 4:
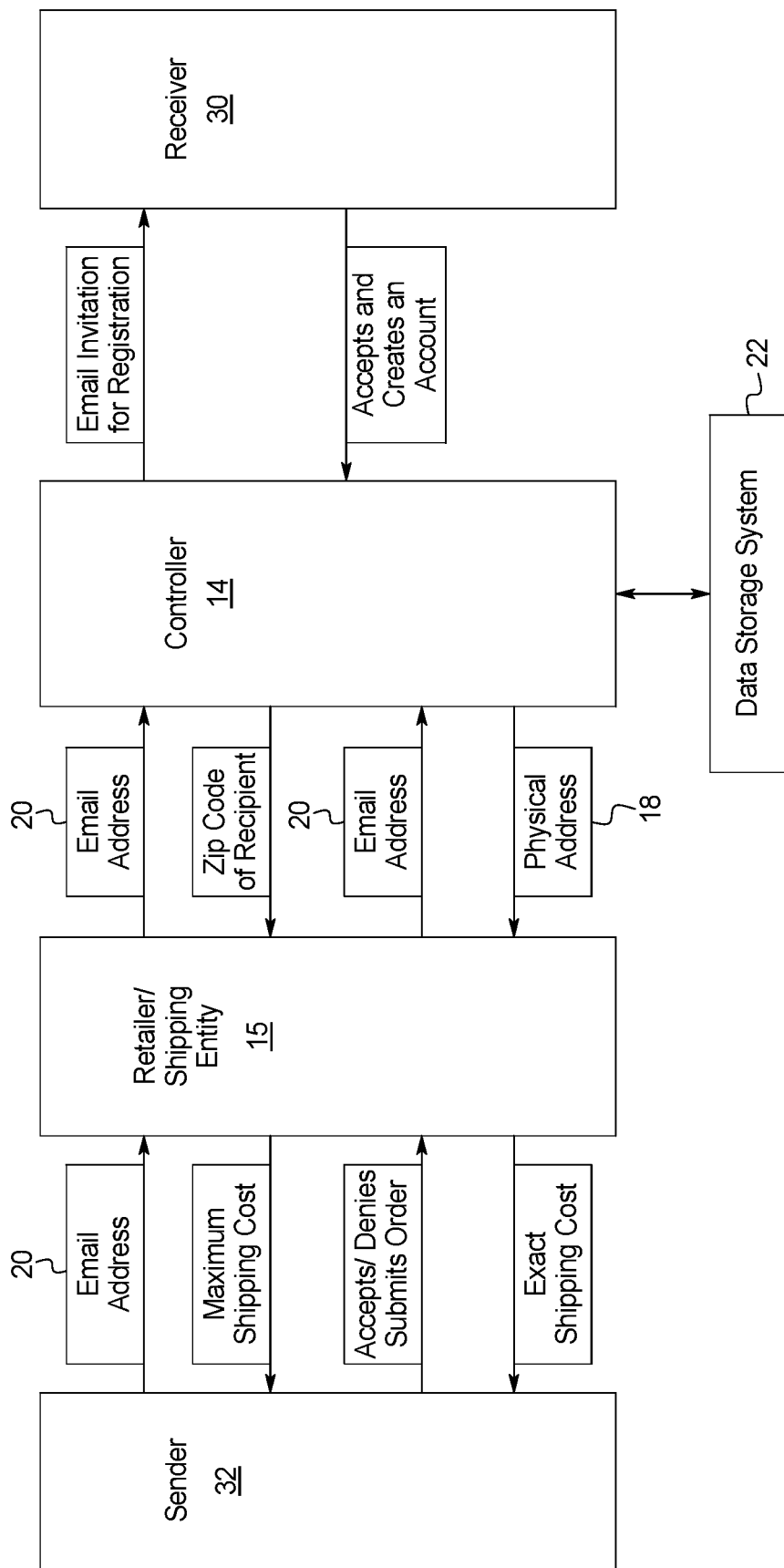
FIG. 4 is a flow diagram including an embodiment of the address exchange system.

For example, in FIG. 4 the sender 32 sends an email address 20 of the receiver 30 to the user 15 (e.g., retailer/shipping company) via the checkout interface 17, wherein the user 15 sends the email address 20 to the controller 14. The controller 14 may determine the email address 20 is not included in the data storage system 22, at which point the controller 14 may send an email invitation to the email address 20 requesting permission to store the email address 20 and an associated physical address 18 in the data storage system 22. If the receiver 30 registered the email address 20 and physical address 18 in the data storage system 22, the controller 14 provides the physical address 18 to the user 15.

In addition, FIG. 4 depicts a situation in which, upon receipt of an email address 20 not contained in the data storage system 22, the controller 14 is configured to request a zip code from the receiver 30, along with an invitation to register the receiver's 30 email address 20 and physical address 18 in the data storage system 22. Once authorization and the zip code is received from the receiver 30, the zip code may be used to estimate and provide a maximum shipping charge to the sender 32. If the user 15 receives confirmation from the sender 32 to proceed with the shipment based on the estimated charge, the transaction may be completed. Subsequently, the receiver 30 may provide the physical address 18 and complete registration. Once the physical address 18 is received, the controller 14 may then provide an exact shipping cost and sales tax to the user 15. The user 15 may then reimburse the sender 32 for any overage charges in the shipping and tax costs. If the email address 20 that is contained in the data storage system 22 is received by the controller 14, the address exchange system 10 may immediately calculate the shipping costs and sales tax for the sender 32 to confirm before completing the purchase.

In another example, upon receipt of an email address 20, the controller 14 is configured to request a zip code from the receiver 30. If the receiver 30 is not registered, the controller 14 indicates to the user 15 that the zip code is not available. The user 15 then calculates the maximum shipping cost and maximum sales tax to complete the transaction. After the transaction is complete, the controller is configured to request registration from the receiver 30, wherein registration includes submitting a physical address 18 associated with the email address 20 of the receiver, to be stored in the data storage system 22. Upon registration, the controller is configured to supply the user 15 with the physical address 18 of the receiver 30 such that the user 15 may calculate the exact sales tax and shipping cost, wherein the sales tax and shipping costs are based on the zip code of the receiver 30. The user 15 may then reimburse the sender 32 for any overcharged amount from the initial charged amount based on the maximum shipping and sales tax costs. Alternatively, if the receiver 30 is registered (i.e., the email address 20 is included in the data storage system 22), the controller may immediately send the zip code of the receiver 30 to the user 15, in order for the user 15 to calculate the sales tax and shipping costs, which will be presented to the sender 30. The sender 32 may then decide to submit the purchase of the item to be sent to the receiver 30.

In another embodiment, the address exchange system 10 comprises a memory 12 coupled to the controller 14, wherein the memory 12 is configured to store program instructions executable by the controller 14. In response to executing the program instructions, the controller 14 is configured to provide a data storage system 22 for storing an association between an identifier 19 and a physical address 18 and further storing one or more permission settings 24 defining situations in which the physical address 18 is to be provided in response to receipt of the identifier 19. The controller 14 is further configured to receive a request to provide the physical address 18, wherein the request includes the identifier 19. In response to receiving a request to provide the physical address 18, the data storage system 22 tests the permission settings 24 to determine whether or not to provide the associated physical address 18.

The request to provide the physical address 18 may be received from an API 16 through which a user 15 selects an item for shipment to a physical address 18, wherein the API 16 is configured to receive an identifier 19 from the user 15 and further configured not to receive the physical address 18 from the user 15. As described above, the request to provide the physical address 18 may further include a password 26.

As shown in FIG. 2, the address exchange system 10 may include various modules including recommendation services 34, advertisement services 36, address book services 38, social media services 40, sample management services 42, alert services 44, and permission and privacy settings 46. Based on a sender's 32 previous purchases or preferences, the recommendation services 34 may suggest the user 15 to promote certain products to the sender 32. For example, if a sender 32 has indicated in his preferences that he is interested in fishing, the recommendation service 34 may suggest, with the sender's 32 permission, to the user 15 to market fishing products to the sender 32.

Similarly, the advertisement services 36 may provide tailored advertisements to a sender 32 based on the sender's 32 previous purchases or the sender's saved preferences. The address exchange system 10 may also include a sample management service 42 that allows senders 32 and receivers 30 to provide authority to certain retailers to send themselves samples of the retailer's products by simply inputting their email address 20 into a designated input in the preference section. In some instances, a user 15 may indicate to the address exchange system 10 that the user 15 needs to distribute a number of samples to appropriate receivers 30. The controller 14 may be configured to then select appropriate receivers 30 based on the receiver's 30 preferences and provide the physical address 18 of all of the appropriate receivers 30 to the user 15 for shipment of the samples.

The address exchange system 10 may further include an address book service 38 that allows senders 32 to manage their contacts by adding, removing, updating, and deleting their contact list via a user interface or an API in communication with the controller 14, as shown in FIG. 2. When a sender 32 is ready to checkout online from the user 15, the sender 32 may select an option wherein user 15 may collect information about the sender 32 from the address book of the sender 32 such that the sender 32 does not need to provide information about himself or herself. The sender 32 may also provide one or more receivers 30 from the user's address book, wherein the address book lists contacts and associated email addresses 20. For example, the checkout interface 17 may display an option requesting access to the sender's 32 address book. The sender 32 may also classify the contacts in predefined groups and may have associated shipping preferences. For example, the group, "Family & Friends", may be associated with a shipping preference that indicates the controller 14 to provide the receiver's 30 home address, whereas the group, "Colleagues", may have a shipping preference that indicates to the controller 14 to provide the receiver's 30 work address. Further, the address book service 38 may be in communication with a social media service 40. For example, a sender 32 may import his contacts from a social networking site into the address book service 38 of the address exchange system 10.

As discussed above, the address exchange system 10 may include a privacy and permission setting module 46 that allows receivers 30 to program preferred privacy and permission settings. The preferred privacy and permission settings may be dependent on each sender 32 or groups, such as "Family & Friends." In addition, the address exchange system 10 may include an alert service 44 that sends a sender 32 or a receiver 30 a notification regarding a shipment, a notification of relevant products, a message regarding an advertisement, a social media alert, among others.

As mentioned above, the address exchange system 10 may also include a recommendation service 34 that stores a sender's 32 life style preferences, birthdates, wish lists, gift receiving behaviors, and product reviews. Various third parties, such as retailers, may use the sender's 32 preference information to provide suitable samples and recommendations of other products through the sample management service 42 and/or the advertisement services 36 of the address exchange system 10. For example, the recommendation service 34 may track the received products and services of the receiver 30 and, upon permission from the receiver 30, share the behavior information with users 15, such as retailers or merchants. With the behavior information, users 15 (e.g., retailers and merchants) may be capable of providing real time recommendations via the recommendation services 34, advertisements via the advertisement services 36, and/or offers via the offer management services 42, all based on the receiver's 30 activity. Similar services, may be presented to a sender 32 based on the sender's 32 activities.

The receiver 30 may also manage his or her physical address 18 through a user interface or an API in communication with the controller 14. For example, if the receiver 30 needs to change or add a physical address 18, the receiver 30 may do so by, for example, logging onto his or her account within the address exchange system 10. In addition, the address exchange system 10 may include an update address service that pushes the receiver's 30 new address to all third party service providers. For example, instead of a receiver 30 contacting each third party service provider (e.g., financial institution, magazine subscriptions, utility company, internal revenue service, etc.), the address exchange system 10 automatically contacts and updates the receiver's 30 address with each third party service provider within the receiver's address book.

As mentioned above, the check out interface 17 and/or the API 16 may be provided within an ecommerce platform and/or shipping platform. Further, as shown in FIG. 5, the sender 32 may provide an email address 20 during check out. For example, instead of entering in a shipping address, the sender 32 enters the email address 20 of the receiver 30. The associated physical address 18 is provided by the address exchange system 10, as described above.

The address exchange system 10 may be integrated within a check out system associated with the user 15 by any suitable manner. For example, the integration may be through a secured, customized API that facilitates data flow between a checkout platform of the user 15 and the address exchange system 10. Alternatively, an external plugin to the checkout module from the address exchange system 10 may be provided. Customized extensions may be created for multiple ecommerce platforms and numerous retailers and merchants. The address exchange system 10 may also be in communication with a payment provider during check out.

As shown, the system 10 is in direct communication with the searchable storage structure 22, which, in one example, may be a database. Of course, in other embodiments, the system 10 may be in communication with the database through a network. While shown and described as a database, it is understood that the database may be any number of databases adapted to support the necessary data management to support the various features and functions of the system 10 described herein. It is further contemplated that a database, as understood in the traditional sense, may not be a requirement of the system 10 described herein, and that any other mechanism or mode of data management may be employed.

In one example, the system 10 includes an electronic device, such as a portable electronic device embodied in a touchscreen-enabled smartphone as the user interface 30. However, it is understood that the teachings provided may be applied to numerous variations of electronic devices with user interfaces 30, including desktop computers, remote controls, etc., as will be recognized by those skilled in the art based on the teachings herein.

As shown in FIG. 1, aspects of the systems described herein are controlled by one or more controllers 14. The one or more controllers 14 may be adapted run a variety of application programs, access and store data, including accessing and storing data in associated databases, and enable one or more interactions as described herein. Typically, the one or more controllers 14 are implemented by one or more programmable data processing devices. The hardware elements, operating systems, and programming languages of such devices are conventional in nature, and it is presumed that those skilled in the art are adequately familiar therewith.

For example, the one or more controllers 14 may be a PC based implementation of a central control processing system utilizing a central processing unit (CPU), memory 14 and an interconnect bus. The CPU may contain a single microcontroller, or it may contain a plurality of microprocessors for configuring the CPU as a multi-processor system. The memory 14 include a main memory, such as a dynamic random access memory (DRAM) and cache, as well as a read only memory, such as a PROM, EPROM, FLASH-EPROM, or the like. The system 10 may also include any form of volatile or non-volatile memory 14. In operation, the memory 14 stores at least portions of instructions for execution by the CPU and data for processing in accord with the executed instructions.

The one or more controllers 14 may also include one or more input/output interfaces for communications with one or more processing systems. Although not shown, one or more such interfaces may enable communications via a network, e.g., to enable sending and receiving instructions electronically. The communication links may be wired or wireless.

The one or more controllers 14 may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller 14. For example, the one or more controllers 14 may include a graphics subsystem to drive the output mechanism. The links of the peripherals to the system may be wired connections or use wireless communications.

Although summarized above as a PC-type implementation, those skilled in the art will recognize that the one or more controllers 14 also encompasses systems such as host computers, servers, workstations, network terminals, and the like. Further one or more controllers 14 may be embodied in a device, such as a mobile electronic device, like a smartphone or tablet computer. In fact, the use of the term controller 14 is intended to represent a broad category of components that are well known in the art.

Hence aspects of the systems and methods provided herein encompass hardware and software for controlling the relevant functions. Software may take the form of code or executable instructions for causing a controller 14 or other programmable equipment to perform the relevant steps, where the code or instructions are carried by or otherwise embodied in a medium readable by the controller 14 or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory 14 of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller 50 can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the method and portable electronic device may be provided based on various combinations of the features and functions from the subject matter provided herein.

We claim:

1. An address exchange system comprising:
   a controller;
   a memory coupled to the controller, wherein the memory stores program instructions executable by the controller;
   wherein in response to executing the program instructions, the controller:
      provides an interface configured to receive an identifier associated with a recipient from a user, an identification of an item for shipment to a physical address associated with the recipient, and a geographical area associated with the recipient, wherein the interface is configured not to receive a physical address from the user;
      upon receiving the identification of the item for shipment from the user, calculates a maximum cost including a cost of the item and at least one of a maximum tax and a maximum shipping cost;
      presents the calculated maximum cost to the user via the interface;
      receives confirmation of payment for the maximum cost;
      upon receiving confirmation of payment, requests the physical address from a data storage system wherein the data storage system stores an association between the identifier and the physical address; and
      retrieves the physical address.

2. The system of claim 1, wherein the physical address is not communicated to the user.

3. The system of claim 1 wherein,
   the calculated maximum cost includes the maximum tax and the confirmation of payment for the maximum cost includes the maximum tax;
   in response to retrieving the physical address, the controller calculates an actual tax based on the physical address; and
   wherein the controller causes reimbursement of the difference between the maximum tax and the actual tax.

4. The system of claim 1 wherein,
   the calculated maximum cost includes the maximum shipping cost and the confirmation of payment for the maximum cost includes the maximum shipping cost;
   in response to retrieving the physical address, the controller calculates an actual shipping cost based on the physical address; and
   wherein the difference between the maximum shipping cost and the actual shipping cost is reimbursed.

5. The system of claim 1, wherein when the physical address was not previously stored in the data storage system, sending a communication to the identifier associated with the recipient, wherein the communication requests the associated physical address and permission to store the associated physical address in the data storage system.

6. The system of claim 1, wherein the identifier is an email address, wherein when the email address was not previously stored in the data storage system, the controller sends a communication to the email address, wherein the communication requests the physical address, wherein the communication requests permission to store the email address and the associated physical address in the data storage system, wherein upon receiving permission to store the email address and the associated physical address in the data storage system, the controller stores the physical address and associated email address in the data storage system.

7. The system of claim 1, wherein the geographical area associated with the recipient is a postal code.

8. The system of claim 1, wherein, after receiving confirmation of receipt of payment from the user of the maximum cost, the controller reimburses the difference between the maximum cost and an actual cost comprising the cost of the item, and at least one of the maximum tax and the maximum shipping cost.

9. An address exchange system comprising:
a controller;
a memory coupled to the controller, wherein the memory stores program instructions executable by the controller;
wherein in response to executing the program instructions, the controller:
provides an interface configured to receive an identifier associated with a recipient from a user and an identification of an item for shipment to a physical address associated with the recipient, wherein the interface is configured not to receive a physical address from the user;
upon receiving the identification of the item for shipment from the user, calculates a maximum cost including a cost of the item and at least one of a maximum tax and a maximum shipping cost;
presents the calculated maximum cost to the user via the interface;
receives confirmation of receipt of payment of the maximum cost;
requests the physical address from a data storage system wherein the data storage system stores an association between the identifier and the physical address; and
retrieves the physical address.

10. The system of claim 9, wherein the physical address is not communicated to the user.

11. The system of claim 9 wherein,
the calculated maximum cost includes the maximum tax and the confirmation of receipt of payment from the user of the maximum cost includes the maximum tax;
in response to retrieving the physical address, the controller calculates an actual tax based on the physical address; and
the controller causes reimbursement of the difference between the maximum tax and the actual tax.

12. The system of claim 9 wherein,
the calculated maximum cost includes the maximum shipping cost and the confirmation of receipt of payment of the maximum cost includes the maximum shipping cost;
in response to retrieving the physical address, the controller calculates an actual shipping cost based on the physical address; and
the controller causes reimbursement of the difference between the maximum shipping cost and the actual shipping cost.

13. The system of claim 9, wherein when the physical address was not previously stored in the data storage system, sending a communication to the identifier associated with the recipient, wherein the communication requests permission to store the identifier and the associated physical address in the data storage system.

14. The system of claim 9, wherein the identifier is an email address, wherein when the email address was not previously stored in the data storage system, the controller sends a communication to the email address, wherein the communication requests the physical address, wherein the communication requests permission to store the email address and the associated physical address in the data storage system, wherein upon receiving permission to store the email address and the associated physical address in the data storage system, the controller stores the physical address and associated email address in the data storage system.

15. The system of claim 9 wherein, after receiving confirmation of receipt of payment from the user of the maximum cost, the controller reimburses the difference between the maximum cost and an actual cost comprising the cost of the item, and at least one of the maximum tax and the maximum shipping cost.

16. An address exchange system comprising:
a controller;
a memory coupled to the controller, wherein the memory stores program instructions executable by the controller;
wherein in response to executing the program instructions, the controller:
provides an interface configured to receive an identifier associated with a recipient from a user and an identification of an item for shipment to a physical address associated with the recipient, wherein the interface is configured not to receive a physical address from the user;
calculates a maximum cost including a cost of the item and at least one of a maximum tax and a maximum shipping cost;
presents the calculated maximum cost to the user via the interface;
receives confirmation of receipt of payment of the maximum cost;
requests the physical address from a data storage system wherein the data storage system stores an association between the identifier and the physical address; and
retrieves the physical address.

17. The system of claim 16, wherein the physical address is not communicated to the user.

18. The system of claim 16, wherein,
the calculated maximum cost includes the maximum tax and the confirmation of payment for the maximum cost includes the maximum tax;
in response to retrieving the physical address, the controller calculates an actual tax based on the physical address; and
the controller causes reimbursement of the difference between the maximum tax and the actual tax.

* * * * *